United States Patent
Delporte et al.

(10) Patent No.: US 8,231,082 B2
(45) Date of Patent: Jul. 31, 2012

(54) METHOD AND DEVICE FOR CORRECTING THE LATERAL DISSYMMETRY OF AN AIRCRAFT

(75) Inventors: Martin Delporte, Fonsorbes (FR); Malika Essadouni, Muret (FR)

(73) Assignee: Airbus Operations SAS, Toulouse (FR)

( * ) Notice: Subject to any disclaimer, the term of this patent is extended or adjusted under 35 U.S.C. 154(b) by 387 days.

(21) Appl. No.: 12/431,662

(22) Filed: Apr. 28, 2009

(65) Prior Publication Data
US 2009/0272851 A1 Nov. 5, 2009

(30) Foreign Application Priority Data
Apr. 30, 2008 (FR) ...................... 08 02428

(51) Int. Cl.
*B64D 37/00* (2006.01)
(52) U.S. Cl. .................................. 244/135 C
(58) Field of Classification Search ............... 244/135 C
See application file for complete search history.

(56) References Cited

U.S. PATENT DOCUMENTS

| 2,755,046 A | 7/1956 | Underwood |
| 2,841,164 A * | 7/1958 | Williamson ................... 137/98 |
| 2,853,259 A | 9/1958 | Underwood |
| 3,419,233 A * | 12/1968 | Wotton ..................... 244/135 R |
| 6,126,111 A | 10/2000 | Burcham |
| 6,913,228 B2 * | 7/2005 | Lee et al. .................. 244/135 C |
| 2005/0139727 A1 * | 6/2005 | Wozniak et al. .......... 244/135 C |
| 2007/0034741 A1 | 2/2007 | Fuller |
| 2007/0084511 A1 * | 4/2007 | Johnson et al. ............... 137/265 |

OTHER PUBLICATIONS

Preliminary Search Report dated Dec. 2, 2008 w/ English translation.

\* cited by examiner

*Primary Examiner* — Tien Dinh
*Assistant Examiner* — Keith L Dixon
(74) *Attorney, Agent, or Firm* — Dickinson Wright PLLC

(57) ABSTRACT

Disclosed is an aircraft that comprises a fuselage, a left wing and a right wing opposite one another with respect to said fuselage and each enclosing at least one fuel tank. The aircraft further includes a control device that controls transfer of fuel from a tank on one wing to a tank on another wing, and an automatic pilot that detects a roll-wise inclination of the aircraft as a result of lateral dissymmetry. The automatic pilot is linked to the control device such that the automatic pilot controls the control device to transfer the fuel only at a condition of rectilinear and uniform cruising flight of the aircraft.

4 Claims, 2 Drawing Sheets

METHOD AND DEVICE FOR CORRECTING THE LATERAL DISSYMMETRY OF AN AIRCRAFT

FIELD OF THE INVENTION

The present invention relates to a method and a device for correcting, in flight, the lateral dissymmetry of an aircraft.

BACKGROUND OF THE RELATED ART

It is known that, by construction, an aircraft may not be perfectly symmetric with respect to its vertical mid-plane and that it exhibits a lateral dissymmetry which, although small and of no danger to safety, presents drawbacks as will be seen hereinafter. Moreover, it is known that such a lateral dissymmetry of construction is manifested in flight mainly by a roll-wise dissymmetry, related to the considerable wingspan.

Such roll-wise dissymmetry can be compensated by differential adjustment of aerodynamic surfaces of the aircraft, such as the high-lift flaps, or by installing a deflector ("wedge") on one of the wings. However, these methods of compensation present several drawbacks:
- for it to be possible to correct the dissymmetry, it must firstly be measured in flight, then, after application of the modification, the correction must also be checked in flight: these methods therefore demand flight time;
- these methods also demand fine tuning on aircraft after leaving the production chain;
- the correction applied to aircraft is definitive: if for one reason or another, the dissymmetry alters over time (modification of the loading or of the layout, works on the airfoil, etc.), then the correction applied is no longer suitable;
- if the dissymmetry noted in flight is not of aerodynamic origin, then an aerodynamically symmetric aircraft is still aerodynamically dissymmetric after correction.

Since, in an obvious manner, the roll-wise dissymmetry of an aircraft is manifested, in flight, by a lateral inclination of the craft, it is possible, in order to avoid the drawbacks of the known methods recalled above, to envisage controlling the ailerons so as to cancel said lateral inclination. Nevertheless, in this case, said ailerons are deflected with respect to their aerodynamically neutral position, so that they generate some increase in the drag and the performance of the aircraft is degraded. Thus, it is then necessary to choose between passenger comfort (zero lateral inclination) and aircraft performance.

SUMMARY OF THE INVENTION

The object of the present invention is to remedy all the drawbacks mentioned above.

To this end, according to the invention, the method for correcting, in flight, the lateral dissymmetry of an aircraft comprising:
- a fuselage,
- a left wing and a right wing, opposite one another with respect to said fuselage and each enclosing at least one fuel tank, and
- an automatic pilot, is noteworthy in that, when said aircraft is in rectilinear and uniform cruising flight, some fuel is transferred from a tank belonging to one wing to a tank belonging to the other of said wings under the control of said automatic pilot detecting the roll-wise inclination of said aircraft which results from said lateral dissymmetry thereof.

It will be noted that said dissymmetry of the aircraft generates an aerodynamic moment which is dependent on the altitude (through the static pressure) and on the Mach number. The mass of fuel transferred from one wing to the other under the control of the automatic pilot creates a moment whose amplitude is dependent on the distance, to the longitudinal axis of the aircraft, of the tank for receiving said mass of fuel and which is intended to balance the moment due to the dissymmetry. Thus, said mass of fuel transferred is a function, not only of said distance from the receiving tank, but also of the altitude and of the Mach number.

As a result, therefore, the mass of fuel transferred is automatically adapted, in real time, to the flight point of the aircraft: the correction of the dissymmetry of the aircraft therefore adapts to the real flight conditions and does not require any fixed adjustment to said aircraft.

It will be noted moreover that it is not necessary for said automatic pilot to know the mass of fuel to be transferred from one wing to the other. It suffices that transfer continue for as long as the dissymmetry has not disappeared or for as long as it has not dropped below a predetermined threshold.

In the case where the automatic pilot is designed to emit a roll command intended to be addressed to the ailerons of the aircraft so as to cancel the roll-wise inclination resulting from the lateral dissymmetry of the aircraft, the fuel transfer is carried out under the control of said roll command, the fuel transfer being performed from a tank of the right wing to a tank of the left wing if said roll command is to the left and, conversely, from a tank of the left wing to a tank of the right wing if said roll command is to the right.

On the other hand, when the automatic pilot emits a signal representative of said roll-wise inclination resulting from the lateral dissymmetry of the aircraft, the fuel transfer is carried out under the control of said signal representative of said roll-wise inclination, the fuel transfer being performed from a tank of the right wing to a tank of the left wing if said roll-wise inclination is towards the right and, conversely, from a tank of the left wing to a tank of the right wing if said roll-wise inclination is towards the left.

It will be noted that it is usual for the aircraft to comprise a controlled system for communication between the tank or tanks of one of the wings and the tank or tanks of the other of said wings, as well as a device for the control of said communication system. In such a case, to implement the present invention, a control link is established between the automatic pilot and the control device of the system for communication between tanks, said control link being enabled only when said aircraft is in rectilinear and uniform cruising flight.

The figures of the appended drawing will elucidate the manner in which the invention may be embodied. In these figures, identical references designate similar elements.

DETAILED DESCRIPTION OF THE INVENTION

Figure 1:
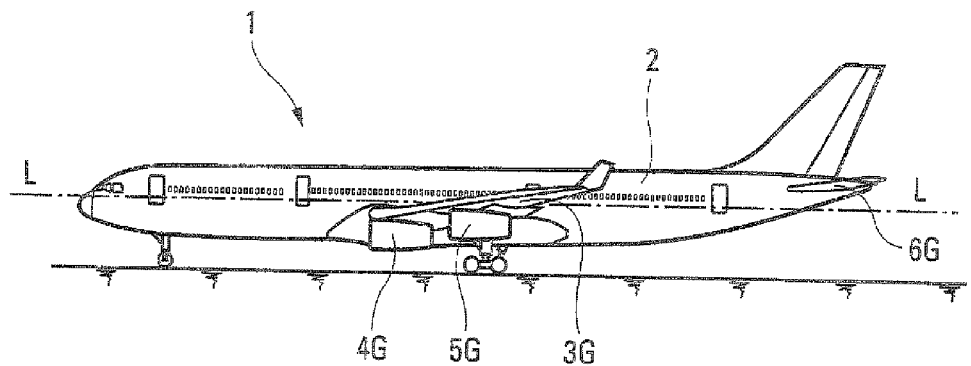
FIG. 1 is a view in elevation of a wide-bodied aircraft standing on the ground.
Figure 2:
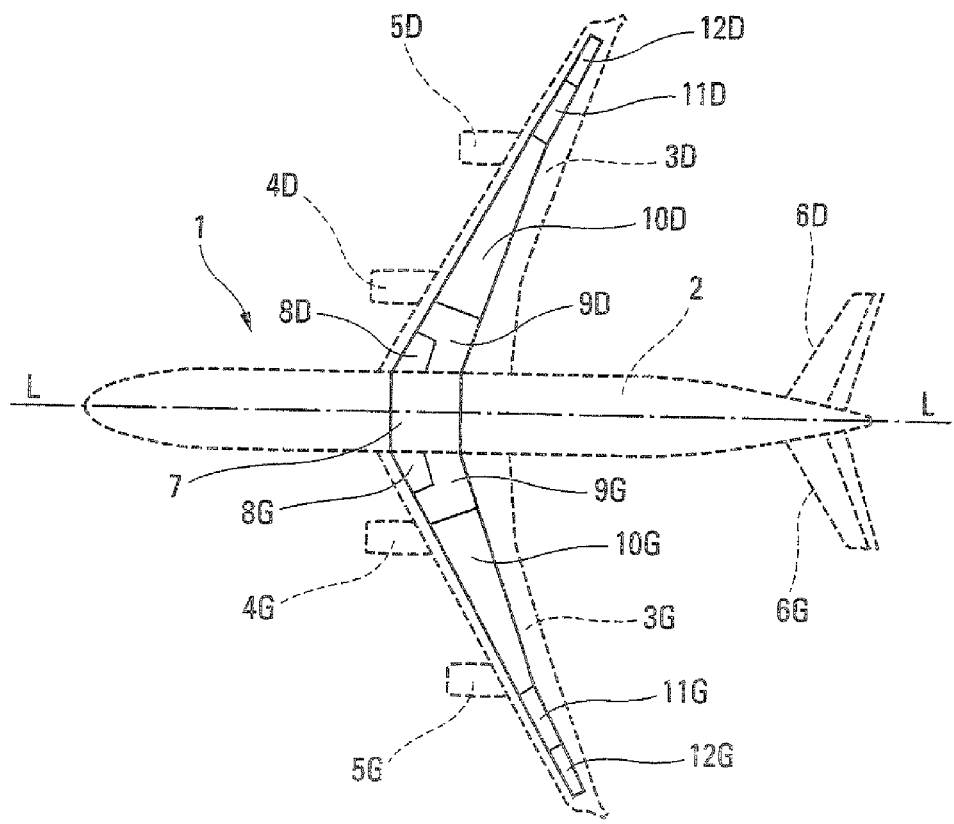
FIG. 2 is a view from above of the wide-bodied aircraft of FIG. 1, in which the outline of said aircraft is represented dashed, although its wing tanks are represented by solid lines.

The wide-bodied aircraft 1, schematically represented in FIGS. 1 and 2, comprises a fuselage 2 of longitudinal axis L-L, a left wing 3G and a right wing 3D, said wings being opposite one another with respect to the fuselage 2. Each wing 3G, 3D bears an inboard engine 4G, 4D and an outboard engine 5G, 5D. The fuselage 2 comprises moreover a rear horizontal empennage comprising a left tailplane 6G and a right tailplane 6D, that are opposite one another with respect to said fuselage.

As is shown in FIG. 2, the airplane 1 comprises a plurality of fuel tanks, namely:
- a central tank 7, provided in the fuselage 2 in the fore part between the two wings 3G and 3D;
- two tanks 8G and 8D;
- two inboard tanks 9G and 9D;
- two intermediate tanks 10G and 10D;
- two outboard tanks 11G and 11D; and
- two vent tanks 12G and 12D.

The tanks 8G to 12G are disposed in the left wing 3G, while the tanks 8D to 12D are housed in the right wing 3D. Moreover, the tanks 8G to 12G are pairwise respectively opposite the tanks 8D to 12D with respect to the fuselage 2.

The tailplanes 6G and 6D of the rear horizontal empennage may also house fuel tanks (not represented).

Figure 3:
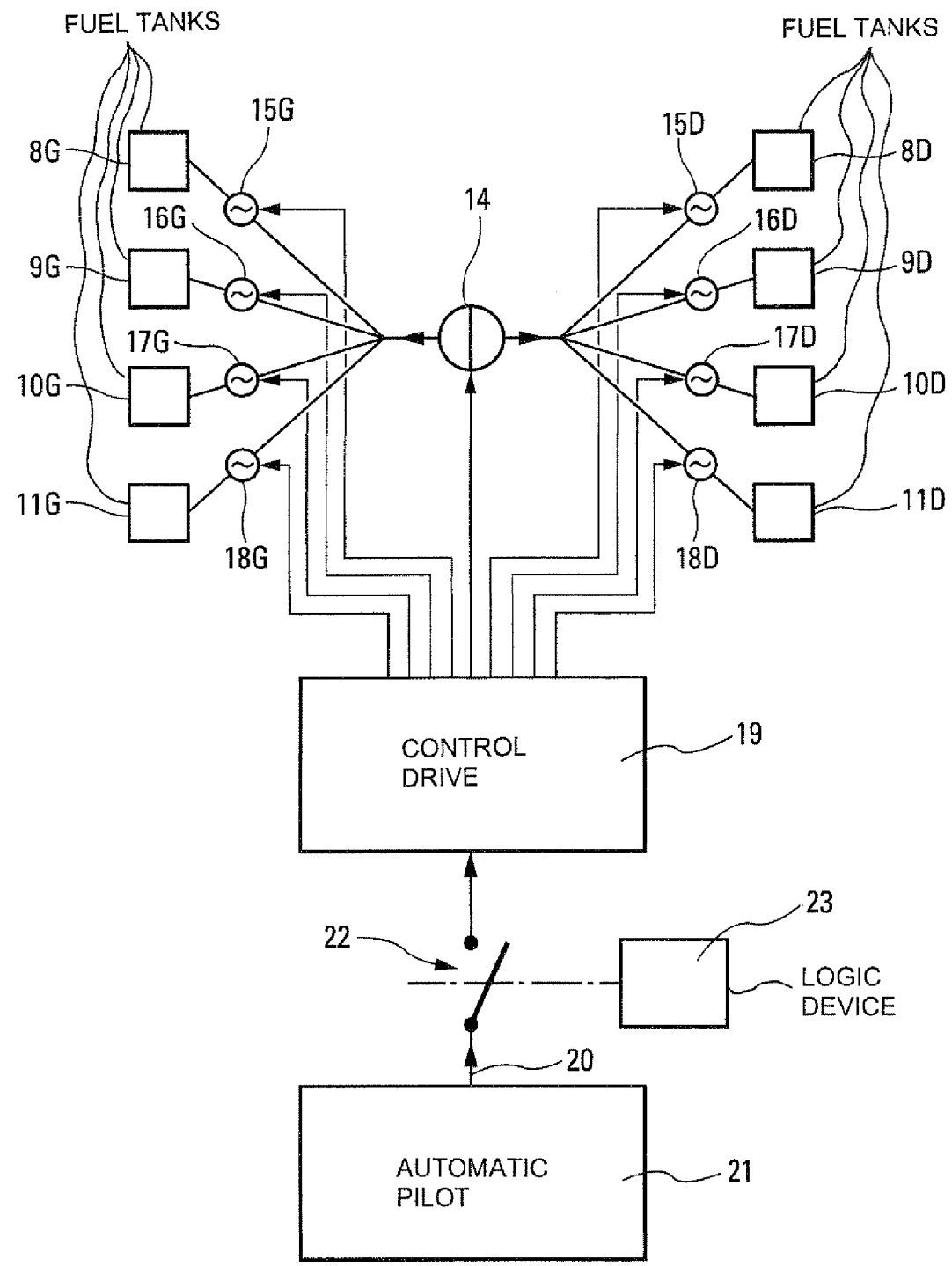
FIG. 3 illustrates the present invention in the form of a schematic diagram.

As illustrated schematically in FIG. 3, each tank 8G, 9G, 10G and 11G of the left wing 3G can be placed in fluid communication with each tank 8D, 9D, 10D and 11D of the right wing 3D by way of a valve system 14, disposed between said wings, and a system of pumps 15G to 18G and 15D to 18D, respectively associated with the tanks 8G to 11G and 8D to 11D.

A device 19 makes it possible to control the opening and closing of the valve system 14 and the operation and shutdown of each of the pumps 15G to 18G and 15D to 18D.

The control device 19 is itself controlled by an output 20 of the automatic pilot 21 of the aircraft 1, by way of a make/break switch 22 (which can be of a purely software nature), whose state is controlled by a logic device 23.

The logic device 23 closes the make/break switch 22, so establishing the link between the automatic pilot 21 and the control device 19 only when the airplane 1 is in rectilinear and uniform cruising flight, that is to say when it is at the cruising altitude with a Mach number corresponding to cruising, when no turn is ordered and when there is no turbulence. Outside of these conditions, the logic device 23 opens said make/break switch 22, so isolating the control device 19 from the automatic pilot 21.

A signal related to the roll-wise inclination of said aircraft appears at the output 20 of the automatic pilot 21. Such a signal may be solely representative of said inclination or else correspond to a roll command tending to cancel said inclination.

In the first case where the signal is a simple measurement of the roll-wise inclination, and when the make/break switch 22 is enabled, the control device 19 controls the valve system 14 and the pumps 15G to 18G and 15D to 18D so that there is, until said roll-wise inclination measurement is zero, or less than a predetermined threshold, a transfer of fuel from a tank, 8D to 11D, of the right wing 3D to a tank, 8G to 11G, of the left wing 3G, if said roll-wise inclination is towards the right, and, conversely, from a tank, 8G to 11G, of the left wing 3G to a tank, 8D to 11D, of the right wing 3D, if the roll-wise inclination is towards the left.

On the other hand, if said signal emitted by the automatic pilot 21 is a roll command addressed to the ailerons of the airplane 1, and when the make/break switch 22 is enabled, the control device 19 controls the valve system 14 and the pumps 15G to 18G and 15D to 18D so as to produce, until said command is zero, or less than a predetermined threshold, a transfer of fuel from a tank, 8D to 11D, of the right wing 3D to a tank, 8G to 11G, of the left wing 3G, if said roll command is to the left, and, conversely, from a tank, 8G to 11G, of the left wing 3G to a tank, 8D to 11D, of the right wing 3D, if said roll command is to the right.

The invention claimed is:

1. An aircraft, comprising:
a fuselage,
a left wing and a right wing opposite one another with respect to said fuselage and each enclosing at least one fuel tank;
a control device that controls transfer of fuel from a tank on one wing to a tank on another wing; and
an automatic pilot that detects a roll-wise inclination of the aircraft as a result of lateral dissymmetry generating an aerodynamic moment,
wherein the automatic pilot is linked to the control device such that the automatic pilot controls the control device to transfer a portion of the fuel, with the transfer of the fuel being made from the tank on the one wing to the tank on the other wing so as to correct the resulting lateral dissymmetry by balancing the aerodynamic moment only at a condition of rectilinear and uniform cruising flight of the aircraft.

2. The aircraft of claim 1, wherein the automatic pilot emits a roll command to cancel said roll-wise inclination resulting from the lateral dissymmetry of the aircraft, in which the fuel transfer is carried out under the control of said roll command, the fuel transfer being performed from a tank of the right wing to a tank of the left wing when said roll command is to the left and, conversely, from a tank of the left wing to a tank of the right wing when said roll command is to the right.

3. The aircraft of claim 1, wherein the automatic pilot emits a signal representative of said roll-wise inclination resulting from the lateral dissymmetry of the aircraft, wherein the fuel transfer is carried out under the control of said signal representative of said roll-wise inclination, the fuel transfer being performed from a tank of the right wing to a tank of the left wing when said roll-wise inclination is towards the right and, conversely, from a tank of the left wing to a tank of the right wing when said roll-wise inclination is towards the left.

4. The aircraft of claim 1,
wherein the control device controls transfer of said fuel only when said roll-wise inclination exceeds a predetermined threshold.

* * * * *